United States Patent [19]
Talavera

[11] 3,833,185
[45] Sept. 3, 1974

[54] MAGNETIC TAPE CASSETTE

[75] Inventor: Jean Joseph Fernand Talavera, Creteil, France

[73] Assignee: Eastman Kodak Company, Rochester, N.Y.

[22] Filed: July 23, 1973

[21] Appl. No.: 381,465

[52] U.S. Cl. ..................... 242/199, 274/4 C, 352/72
[51] Int. Cl.... G03b 1/04, G11b 15/32, G11b 23/04
[58] Field of Search ............. 242/197, 200; 274/4 B, 274/4 C, 11 B, 11 C; 179/100.2 Z; 352/72, 78

[56] References Cited

UNITED STATES PATENTS

| | | | |
|---|---|---|---|
| 2,022,353 | 11/1935 | Kindelmann et al | 242/199 |
| 2,118,896 | 5/1938 | Pearlman et al. | 242/199 |
| 3,065,922 | 11/1962 | Ballauf | 242/199 |
| 3,111,281 | 11/1963 | Sinkewitsch | 242/200 |

*Primary Examiner*—Leonard D. Christian
*Attorney, Agent, or Firm*—Mr. W. F. Delaney

[57] ABSTRACT

A tape cassette is provided with resiliently biased braking and guiding arms having spaced guide surfaces for guiding the tape edges to maintain alignment of the tape with the convolutions of tape wound on the tape core.

3 Claims, 2 Drawing Figures

PATENTED SEP 3 1974 3,833,185

MAGNETIC TAPE CASSETTE

BACKGROUND OF THE INVENTION

1. Field of the Invention

The present invention relates to magnetic tape cassettes for use in presently available tape recorders. More particularly, this invention relates to improved means for guiding tape onto a spool and for providing a constant tension on the tape in such cassettes.

2. Description of the Prior Art

In the field of magnetic tape recording, there are several types of tape cassette and recorder systems employing the two single-spool cassettes or a single cassette containing two spools. An example of such a two spool cassette and recorder system is disclosed in U.S. Pat. No. 3,111,281. The cassette disclosed in that patent includes two spools of tape wound on rotatably mounted cores adapted to be driven by drive spindles on tape recorders adapted to receive such cassettes. The cassette housing has various openings to enable cooperation of recorder apparatus with tape in the cassette cartridge, for example tape heads for record, playback, and erase and tape drive mechanisms. The disclosed cassette includes roller posts and various other guide members defining the path of tape from one spool past the various openings in the cassette housing to the other spool.

Since magnetic tape is limp, it tends not to follow the defined path from spool to spool if slack is permitted between the spools. Slight slackness in the tape results in uneven recording and playback, and any accumulation of slack tape will collect in the cassette and can jam the spool. Accordingly, such cassettes usually include brake means to maintain a constant tension on the tape between the spools.

Also, two-spool cassettes usually include guide means for directing tape onto the spools in alignment with tape on the spools to avoid having the spool convolutions becoming misaligned and jamming against the cartridge housing.

The cassette disclosed in U.S. Pat. No. 3,111,281 includes a typical braking and guiding means in the form of pivot arms biased into engagement with the tape spools to provide a frictional drag on the spool that stops the spool when the tape is not being advanced. Such pivotal brake arms typically include a guide channel for maintaining alignment of the tape with the convolutions on the spool.

Various designs of brake arms and guiding means have been attempted to provide a uniform tension on the spool by means of a simple mechanism that is inexpensive to manufacture and easy to assemble. Most brake arms of the described type are biased by a separate spring resiliently urging the arm into engagement with the outer convolution of the spool. Such brake arms have been mounted in many different positions, for example in the corner of the cassette opposite the roller post directing tape onto the spool. Such an arrangement is generally satisfactory, but the tension provided by such a spring increases as the diameter of the spool increases resulting in an increasing frictional drag as the spools diameter increases. Also, mounting the arm with its pivot axis in the corner causes the brake arm to contact the spool at a point that varies as the diameter of the spool varies. Thus, when the spool diameter is relatively small in such a cassette, the brake contacts the tape after it is on the spool and the guide means on the brake arm is rendered less effective in guiding tape onto the outer convolution of spooled tape. When the spool diameter is relatively large, the brake surface engages the tape before it is wound onto the spool and the tape tends to pull the brake off the spool, which alters the frictional tension applied to the tape.

SUMMARY OF THE INVENTION

It is an object of this invention to provide an improved tape cassette of the type having a spool for winding magnetic tape, a guide member for directing tape onto the spool and a pivotal brake arm for providing tension on the spool of tape.

It is a further object of this invention to provide such a tape cassette having an improved braking and guiding means for maintaining tension on the tape and for maintaining alignment of the tape.

It is a further object of this invention to provide such an improved braking and guiding means for tape cassettes for providing generally uniform tension on the tape by means of a simple integral structure that is inexpensive and easy to manufacture and assemble.

These objects are accomplished in a tape cassette of the type including a rotatably mounted core for supporting a spool of tape and a guide member defining the path of tape to the outer convolution of the spool, by means of tape guiding and tensioning means comprising a brake arm having one end pivotally mounted adjacent the guide member and having on the other end means defining a brake surface engageable with the outer convolution of tape on the spool at substantially the same tangent point at which tape is directed onto that outer convolution from the guide member, and a resilient arm attached to the brake arm nearer the brake surface end than the pivot axis end and extending from the brake arm at an acute angle toward the pivot axis into resilient sliding engagement against a bearing surface. According to a preferred embodiment of the invention, the bearing surface is defined by an inner surface of the cassette housing, and the brake arm is provided with a pair of guide surfaces adjacent the brake surface for guiding the tape edges to maintain alignment of the tape with the convolutions on the spool.

A feature of this invention is that the brake arm and resilient arm can be integrally molded in one piece which reduces the expense of manufacture and assembly. Another feature of the invention is that the brake surface contacts the spool substantially at the tangent point at which tape is directed onto the spool, such that the tension provided by the brake arm is not effected by the tape as it is wound on the spool and the guide surfaces guide the tape at the tangent point at which it is fed onto the outer convolution of the spool.

It should be understood that a tape guiding and tensioning means according to this invention can be incorporated in a tape cassette of the type including a single spool or of the type including a pair of spools.

BRIEF DESCRIPTION OF THE DRAWINGS

These and other features of the invention will be apparent from the following detailed description of illustrative preferred embodiments of the invention, reference being made to the accompanying drawings in which like reference numerals refer to like elements, and in which.

DESCRIPTION OF THE PREFERRED EMBODIMENTS

Figure 1:
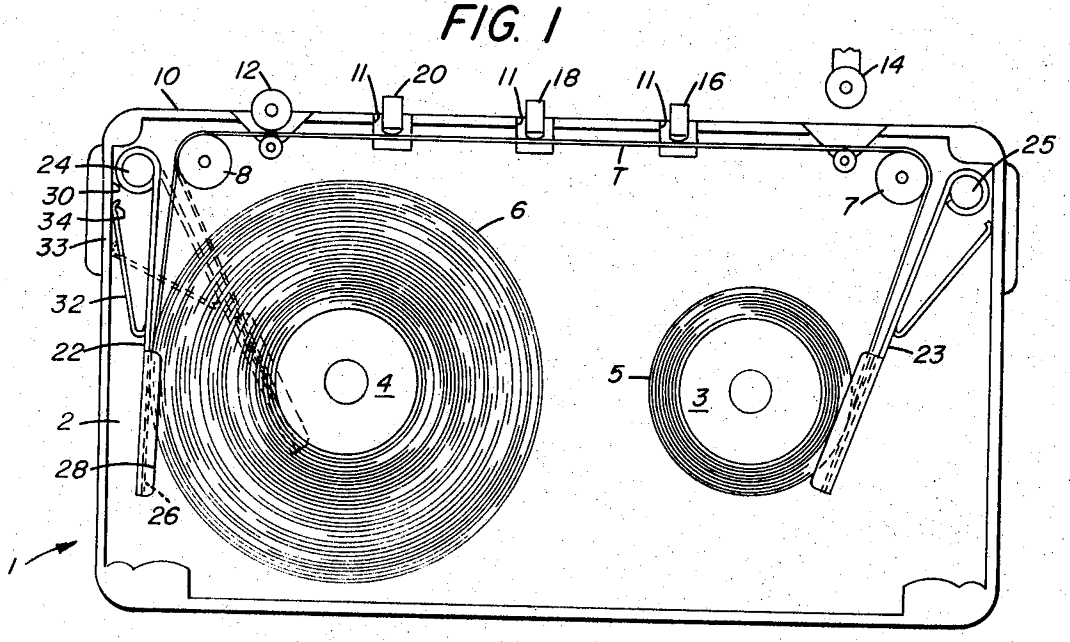
FIG. 1 is a plane view of the interior structure of a tape cartridge according to a preferred embodiment of the invention.

Referring now in detail to the drawings, FIG. 1 shows the interior of a tape cartridge 1 according to a preferred embodiment of the invention, including an outer housing 2, usually in the form of two shells or trays which are sealed together to form a generally flat rectangular compartment enclosing a supply core 3 and a take-up core 4 mounted in a side-by-side relation for rotation in the same plane about parallel axis. Although not shown in the drawing, the cores are each adapted to receive drive spindles of commercially available tape recording apparatus, which are adapted to drivingly engage the cores. The opposite ends of the tape T are attached to the two cores and the end portions are wound in spools 5 and the cores such that the tape can be advanced from one spool to the other along a predetermined path. The path of the tape between the cores is defined by guide rollers 7 and 8 and other guide members not shown. As the tape passes between the guide rollers 7 and 8 it passes along the front wall 10 of the cartridge having a plurality of access openings 11 which permit various recorder apparatus to engage the tape, for example drive rollers 12 and 14 and tape heads 16, 18 and 20 for recording, play-back and erase, respectively.

To prevent tape from becoming slack between the two spools, brake means are provided according to the invention to engage the spools with a generally constant frictional drag. The brake means includes brake arms 22 and 23 pivotally mounted on spindles 24 and 25 adjacent the roller posts 8 and 7 respectively. Since the braking and guiding means for each spool shown in FIG. 1 are substantially the same, the remaining description refers only to such means operating with the spool 6. The opposite end of the brake arm 22 includes means defining a brake surface 26 and a pair of guide members 28 that define with the brake surface a U-shaped channel for guiding the edges of the tape to maintain the tape in alignment with the spool 6. The brake arm 22 is urged into frictional engagement with the outer convolution on the spool 6 by means of a resilient arm 32 attached to the brake arm nearer the brake surface than to the pivot end of the arm and extending at an acute angle toward the pivot spindle 24 into sliding engagement with the interior surface 30 of the sidewall 33 of the cassette housing 2. In the embodiment shown in FIG. 1 the resilient arm 32 is integrally molded with the brake arm 22 and it has a curved end portion 34 that slideably engages the wall surface 33 such that rotation of the brake arm 22 causes the resilient arm to slide along the wall and maintain a generally constant resilient pressure on the brake arm 22 regardless of the radial position of the brake arm 22. It can also be seen that the position of the spindle 24 adjacent the roller post 8 enables the brake surface 26 on the opposite end of the brake arm 22 to contact the spool substantially at the tangent point at which tape is fed onto or from the spool 6, regardless of the amount of tape on the spool.

Although the preferred embodiments shown in FIG. 1 discloses a brake and guide means according to the invention in a two reel type of cassette, it should be understood that the invention can be incorporated in a single reel type of cassette.

Figure 2:
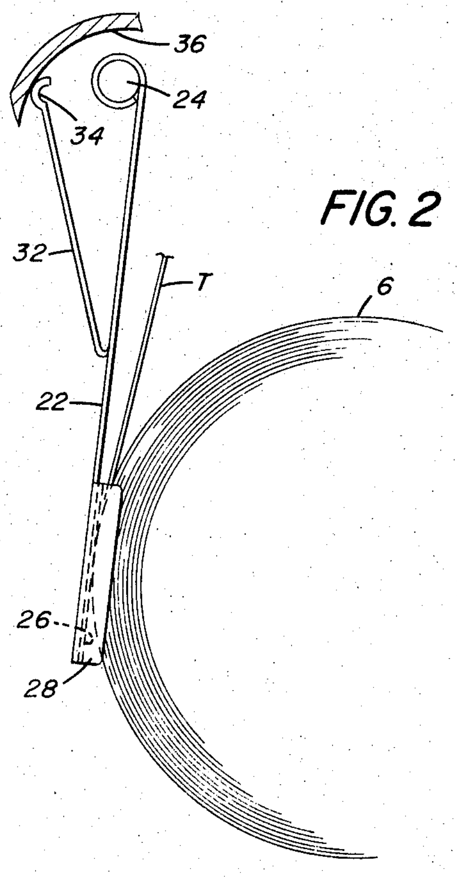
FIG. 2 is a plane view of a braking and guiding means according to another preferred embodiment of the invention.

An alternative embodiment of the invention is illustratively shown in FIG. 2 in which a portion of the structure is shown in FIG. 1 in a modified form. In FIG. 2 a portion of the spool 6 is shown with the brake arm 22, the brake surface 26 and the guide members 28. Attached to the brake arm is a resilient arm 32 slidingly engaged with a bearing surface 36 which is curved according to a predetermined profile. This bearing surface is located in vicinity of spindle 24, and its profile determines the variation of flection of the resilient arm 32 in the various positions of the brake arm 22. Thus the tension applied by the brake surface 26 on the spool 6 are varied in a predetermined manner as defined by the profile by the bearing surface 36. The bearing surface can have any desired profile.

The invention has been described in detail with particular reference to preferred embodiments thereof, but it will be understood that variations and modifications can be effected within the spirit and scope of the invention.

What is claimed is:

1. In a tape cassette including a rotatably mounted core having a cylindrical surface for supporting tape wound thereon, and a guide member defining the path of tape to the outer convolution of tape on the core, tape guiding and tensioning means comprising:

a. a brake arm having one end pivotally mounted adjacent said guide member and having on the opposite end means defining a brake surface adapted to engage the outer convolution of tape on the core at substantially the same tangent point at which tape is directed onto said outer convolution from said guide member;

b. means for resiliently biasing said brake surface into engagement with tape wound on the core, said bias means including means defining a bearing surface and a resilient arm attached to said brake arm and extending into resilient sliding engagement against said bearing surface, said resilient arm being attached to said brake arm nearer to the brake surface end than the pivot axis end and extending from the brake arm at an acute angle generally toward said pivot axis; and c. guide means on said brake arm defining a pair of guide surfaces for guiding the tape edges to maintain alignment of the tape with the convolutions of tape wound on said core.

2. The invention claimed in claim 1 wherein said brake arm and said resilient arm are integral.

3. A tape cassette as claimed in claim 1 and including a housing, wherein said bearing surface is defined by an inner surface of the housing.

* * * * *

UNITED STATES PATENT OFFICE
CERTIFICATE OF CORRECTION

Patent No. 3,833,185 Dated September 3, 1974

Inventor(s) Jean Joseph Fernand Talavera

It is certified that error appears in the above-identified patent and that said Letters Patent are hereby corrected as shown below:

On the Cover Sheet, the following should be added:

-- [30] Foreign Application Priority Data
July 25, 1972 France--------7,226,666 --.

Signed and sealed this 22nd day of April 1975.

(SEAL)
Attest:

RUTH C. MASON
Attesting Officer

C. MARSHALL DANN
Commissioner of Patents and Trademarks

FORM PO-1050 (10-69)

USCOMM-DC 60376-P69
U.S. GOVERNMENT PRINTING OFFICE : 869-930